US008149993B2

(12) United States Patent
Cline et al.

(10) Patent No.: US 8,149,993 B2
(45) Date of Patent: *Apr. 3, 2012

(54) EVALUATING PERFORMANCE OF A VOICE MAIL SUB-SYSTEM IN AN INTER-MESSAGING NETWORK

(75) Inventors: John E. Cline, Lawrenceville, GA (US); Roger K. Ruppert, Kennesaw, GA (US); Joseph H. Myers, Jr., Pelham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 924 days.

This patent is subject to a terminal disclaimer.

(21) Appl. No.: 12/125,244

(22) Filed: May 22, 2008

(65) Prior Publication Data

US 2008/0219417 A1 Sep. 11, 2008

Related U.S. Application Data

(63) Continuation of application No. 10/610,773, filed on Jun. 30, 2003, now Pat. No. 7,379,535.

(51) Int. Cl.
*H04M 1/24* (2006.01)
*H04M 3/22* (2006.01)

(52) U.S. Cl. ........... 379/1.02; 379/10.03; 379/26.02; 379/88.17; 379/114.14; 379/221.01; 455/413; 709/224; 714/40

(58) Field of Classification Search ............. 379/1.02, 379/26.08, 88.17, 88.18, 10.03, 26.02, 114.14, 379/221.01, 221.03; 455/413; 709/224; 714/40

See application file for complete search history.

(56) References Cited

U.S. PATENT DOCUMENTS

| 5,329,579 A | 7/1994 | Brunson |
| 5,572,570 A | 11/1996 | Kuenzig |
| 5,835,565 A | 11/1998 | Smith |
| 5,933,475 A | 8/1999 | Coleman |
| 6,091,802 A * | 7/2000 | Smith et al. ............. 379/10.03 |
| 6,112,237 A * | 8/2000 | Donaldson et al. ........ 709/224 |
| 6,292,909 B1 | 9/2001 | Hare |
| 6,405,149 B1 | 6/2002 | Tsai |
| 6,477,492 B1 | 11/2002 | Connor |
| 6,504,905 B1 | 1/2003 | Tsai |
| 6,516,051 B2 | 2/2003 | Sanders |
| 6,601,068 B1 * | 7/2003 | Park ................................. 1/1 |
| 6,810,114 B2 * | 10/2004 | Welfley .................... 379/88.18 |

(Continued)

OTHER PUBLICATIONS

CLINE; Notice of Allowance mailed Jan. 5, 2011 for U.S. Appl. No. 11/844,747, filed Aug. 24, 2007.

(Continued)

*Primary Examiner* — Gerald Gauthier
(74) *Attorney, Agent, or Firm* — Thomas, Kayden, Horstemeyer & Risley, LLP

(57) ABSTRACT

One preferred embodiment of the present invention provides a system and method for evaluating the performance of a network interface sub-system of an inter-messaging network of voice mail systems. This preferred embodiment includes a network query device that connects to the inter-messaging network and requests a test data file to be retrieved from a particular voice mail network interface sub-system in the inter-messaging network. The requests for the test data file are generated according to user command. Accordingly, the performance of a network interface sub-system in the inter-messaging network, as represented by the result of the request attempt, is evaluated according to a defined level of performance, such as a preferred time limit. Other systems and methods are also provided.

20 Claims, 11 Drawing Sheets

U.S. PATENT DOCUMENTS

| | | | |
|---|---|---|---|
| 6,850,928 B1 | 2/2005 | McClure | |
| 7,263,173 B2 | 8/2007 | Cline | |
| 7,263,176 B2 * | 8/2007 | Cline et al. | 379/26.02 |
| 7,379,535 B2 * | 5/2008 | Cline et al. | 379/1.02 |
| 7,724,880 B2 * | 5/2010 | Forney et al. | 379/88.18 |
| 7,933,384 B2 | 4/2011 | Cline et al. | |
| 8,045,694 B2 * | 10/2011 | Bonn et al. | 379/221.01 |
| 2002/0077819 A1 | 6/2002 | Girardo | |
| 2004/0190494 A1 | 9/2004 | Bauer | |
| 2005/0152520 A1 * | 7/2005 | Logue | 379/114.14 |
| 2008/0219417 A1 * | 9/2008 | Cline et al. | 379/88.17 |

OTHER PUBLICATIONS

CLINE; Non-Final Office Action mailed Sep. 17, 2010 for U.S. Appl. No. 11/844,747, filed Aug. 24, 2007.

Cline; U.S. Appl. No. 10/611,205, filed Jun. 30, 2003.

Cline; U.S. Appl. No. 11/844,747, filed Aug. 24, 2007.

Cline; U.S. Appl. No. 10/610,773, filed Jun. 30, 2003.

Cline; U.S. Appl. No. 10/611,206, filed Jun. 30, 2003.

Cline; Non-Final Rejection mailed Mar. 6, 2007 U.S. Appl. No. 10/611,205, filed Jun. 30, 2003.

Cline; Non-Final Rejection mailed Oct. 6, 2006 U.S. Appl. No. 10/611,205, filed Jun. 30, 2003.

Cline; Notice of Allowance and Fees Due mailed Jun. 14, 2007 U.S. Appl. No. 10/611,205, filed Jun. 30, 2003.

Cline; Final Rejection mailed Feb. 27, 2006 for U.S. Appl. No. 10/610,773, filed Jun. 30, 2003.

Cline; Non-Final Rejection mailed Jun. 15, 2007 for U.S. Appl. No. 10/610,773, filed Jun. 30, 2003.

Cline; Non-Final Rejection mailed Aug. 1, 2006 for U.S. Appl. No. 10/610,773, filed Jun. 30, 2003.

Cline; Non-Final Rejection mailed Sep. 7, 2005 for U.S. Appl. No. 10/610,773, filed Jun. 30, 2003.

Cline; Non-Final Rejection mailed Oct. 16, 2007 for U.S. Appl. No. 10/610,773, filed Jun. 30, 2003.

Cline; Notice of Allowance and Fees Due mailed Mar. 14, 2008 for U.S. Appl. No. 10/610,773, filed Jun. 30, 2003.

Cline; Final Rejection mailed Feb. 27, 2006; U.S. Appl. No. 10/611,206, filed Jun. 30, 2003.

Cline; Non-Final Rejection mailed Jan. 5, 2007 U.S. Appl. No. 10/611,206, filed Jun. 30, 2003.

Cline; Non-Final Rejection mailed Aug. 2, 2006 U.S. Appl. No. 10/611,206, filed Jun. 30, 2003.

Cline; Non-Final Rejection mailed Sep. 7, 2005 U.S. Appl. No. 10/611,206, filed Jun. 30, 2003.

Cline; Notice of Allowance and Fees Due mailed Jun. 26, 2007; U.S. Appl. No. 10/611,206, filed Jun. 30, 2003.

* cited by examiner

C:\perl c:\util\namequery.pl
Voice Mail Sub-System Evaluation Program  ◄──── USER INPUT  ◄──── 710

This program allows the user to query a VMS platform for Spoken Name via any single NU or all NUs active on the remote platform. The remote platform may be specified by a System ID or the Test MailBox Number for that platform Local Voice Mail Platform System ID = VMS95  ◄──── 715

Select Remote or Local Voicemail Platform by Entering
System ID, Mailbox, Q to EXIT or <ENTER> for Local Platform:  ◄──── 720

VMS97        ◄──── USER INPUT  ◄──── 725

SystemID = VMS97  NU1_IP = 172.##.##.64

Presentation DOMAIN = miamvms01
Please Wait While NUs are Pinged
The Following IPs On the Remote System Are Active:  ◄──── 730
64 65 66 67 68 69 70 71 72 73

Enter NU Number, "A" or (ENTER) for ALL, "P" for New Platform or "Q" to Quit:

1        ◄──── USER INPUT  ◄──── 735

Default Test Mailbox = 5558769555
Enter 10 Digit Mailbox, <ENTER> to Accept Default Mailbox or "Q" to QUIT

<CR>       ◄──── USER INPUT  ◄──── 740

IMND Query for 5558769555 - 3/31  14:8:12
    mailRecipient: +15558769555@miamvms01.messaging.#####.com  ◄──── 745

NameQuery for 5558769555 from VMS97 NU1 at 172.##.##.65
DELAY=2
    dn: mailrecipient=+15558769555@miamvms01.messaging.#####.com  ◄──── 750
    vpimspokenname:: QSHzIzEh8hLO3x3tz/vzEp3/rPzi/  ◄──── 755
82u+v3PHeHx3cz8Ev7MP9sR8t

FIG. 7

Enter NU Number, "A" or (ENTER) for ALL, "P" for New Platform or "Q" to Quit:

A ← 810
←—— USER INPUT

NameQuery for 5558769555 from VMS97 NU1 at 172.##.##.65
DELAY=2
    dn: mailrecipient=+15558769555@miamsvms01.messaging.#####.com
    vpimspokenname:: QSHzIzEh8hLO3x3tz/vzEp3/rPzi/82u+v3PHeHx3cz8  820
...

NameQuery for 5558769555 from VMS97 NU2 at 172.##.##.67
DELAY=2
    dn: mailrecipient=+15558769555@miamvms01.messaging.#####.com
    vpimspokenname:: QSHzIzEh8hLO3x3tz/vzEp3/rPzi/82u+v3PHeHx3cz8  825
...

NameQuery for 5558769555 from VMS97 NU3 at 172.##.##.69
DELAY=2
    dn: mailrecipient=+15558769555@miamvms01.messaging.#####.com
    vpimspokenname:: QSHzIzEh8hLO3x3tz/vzEp3/rPzi/82u+v3PHeHx3cz8  830
...

NameQuery for 5558769555 from VMS97 NU4 at 172.##.##.71
DELAY=3
    dn: mailrecipient=+15558769555@miamvms01.messaging.#####.com
    vpimspokenname:: QSHzIzEh8hLO3x3tz/vzEp3/rPzi/82u+v3PHeHx3cz8 835
...

NameQuery for 5558769555 from VMS97 NU5 at 172.##.##.73
DELAY=2
    dn: mailrecipient=+15558769555@miamvms01.messaging.#####.com
    vpimspokenname:: QSHzIzEh8hLO3x3tz/vzEp3/rPzi/82u+v3PHeHx3cz8  840

FIG. 8

Enter NU Number, "A" or (ENTER) for ALL, "P" for New Platform or "Q" to Quit:

P  ←——— USER INPUT  ←⎯⎯⎯
                                                                910
Select Remote or Local Voicemail Platform by Entering
System ID, MailBox, Q to EXIT or <ENTER> for Local Platform:

VMS77  ←——— USER INPUT  ←⎯⎯⎯
                                                                915
SystemID = VMS77  NU1_IP = 172.##.###.11
Presentation DOMAIN = rlghnvms02

Please Wait While NUs are Pinged
The Following IPs On the Remote System Are Active:
117 118 119 120

Enter NU Number, "A" or (ENTER) for ALL, "P" for New Platform or "Q" to Quit:

2

←——— USER INPUT  ←⎯⎯⎯
Default Test Mailbox = 5553875555                               920
Enter 10 Digit Mailbox, <ENTER> to Accept Default Mailbox or "Q" to QUIT 5554043755
          ←——— USER INPUT  ←⎯⎯⎯
IMND Query for 5554043755 - 3/31  14:28:45                      925
     mailRecipient: +1555404553755@rlghnvms02.messaging.#####.com
...
NameQuery for 5554043755 from VMS77 NU2 at 172.##.###.120 DELAY=2
     dn: mailrecipient=+15554043755@rlghnvms02.messaging.#####.com
     vpimspokenname:: vt783DEh8oKqvMvd3s3d3/3sH/7v797L/uv/8r3Ou9se8

FIG. 9

Enter NU Number, "A" or (ENTER) for ALL, "P" for New Platform or "Q" to Quit:

P  ←—— USER INPUT

Select Remote or Local Voicemail Platform by Entering
System ID, MailBox, Q to EXIT or <ENTER> for Local Platform:

30116  ←—— USER INPUT  ←——— 1010

SystemID = 30116  NU1_IP = 172.17.50.128

Presentation DOMAIN = orldvms03
Please Wait While NUs are Pinged              1020
The Following IPs On the Remote System Are Active:
128 129 130
Enter NU Number, "A" or (ENTER) for ALL, "P" for New Platform or "Q" to Quit:

<CR>  ←—— USER INPUT  ←——— 1030

Default Test Mailbox = 5553285520
Enter 10 Digit Mailbox, <ENTER> to Accept Default Mailbox or "Q" to QUIT

<CR>  ←—— USER INPUT

RMD Query for 5553285520 - 4/2  16:38:18
    mailRecipient: +15553285520@orldvms03.messaging.#####.com  1040
...
NameQuery for 5553285520 from 30116 NU1 at 172.##.##.129 DELAY=2
    dn: mailrecipient=+15553285520@ORLDVMS03.MESSAGING.#####.COM
    vpimspokenname:: QSHzIzHR/X1WNDMjMiIjIiIyIiIyIiIhIyETIyIXMi8jEj

FIG. 10

EVALUATING PERFORMANCE OF A VOICE MAIL SUB-SYSTEM IN AN INTER-MESSAGING NETWORK

CROSS-REFERENCE TO RELATED APPLICATIONS

This application is a continuation of copending U.S. utility application entitled, "Evaluating Performance of a Voice Mail Sub-System in an Inter-Messaging Network," having Ser. No. 10/610,773, filed Jun. 30, 2003, which is entirely incorporated herein by reference.

TECHNICAL FIELD

The present invention is generally related to messaging systems and, more particularly, is related to the evaluation of messaging systems.

BACKGROUND

Messaging systems constitute a wide variety of technological systems that are provided by numerous different vendors. Accordingly, systems for linking different technological systems have been developed. For example, the voice mail industry adopted the Audio Messaging Interchange Specification (AMIS) standard for exchanging messages between different voice mail systems. AMIS addresses the problem of inter-networking voice mail systems produced by different vendors.

There are two specifications for AMIS. One called AMIS-Analog uses dual tone multi-frequency (DTMF) tones to convey control information in analog transmissions of voice mail messages. Particularly, in the analog standard, AMIS defines a messaging standard where one voice mail system dials a second voice mail system and plays back DTMF codes from the message header that identifies the target mailbox. Then, the second voice mail system plays back the message to be delivered.

An AMIS-compatible message contains a standard header that includes address information such as the dial-in number of the addressee's voice mail system, the addressee's mailbox number, etc. By recording and storing the received message in the format native to the receiving system, the issue of incompatible message file formats is avoided.

The analog AMIS protocol is simpler and less capable than the second AMIS specification, AMIS-Digital. AMIS-Digital is based on completely digital interaction between two voice messaging systems. Control information and the voice message itself is conveyed between systems in digital form. By contrast, the AMIS-Analog specification calls for the use of DTMF tones to convey control information, and transmission of the message itself is in analog form.

The AMIS-Digital specification is more robust than AMIS-Analog, providing a combination of features from the X.400 messaging recommendation and features commonly available in voice mail systems. For example, it supports features such as inclusion of a message originator's spoken name, and message addressing options such as delivery notification, confidential message, and future delivery.

Building upon the AMIS-Digital standard, Voice Profile for Internet Messaging (VPIM) is a proposed Internet messaging protocol to allow disparate voice mail systems to exchange voice mail over the Internet. VPIM builds on Simple Mail Transfer Protocol (SMTP) and Multi-purpose Internet Message Extensions (MIME) standards. These in turn are built upon the Transport Control Protocol/Internet Protocol (TCP/IP) infrastructures for email interchange to allow standardized exchange of voice and fax messages among servers.

By supporting the AMIS and VPIM standards, for example, today's leading voice mail messaging providers are developing systems that can communicate and interact with systems from other providers. However, with a network involving different messaging technologies provided by different vendors, there is a problem in ensuring that the performance of the network is satisfactory. For example, even though an intended voice mail message may be delivered to its intended recipient, the transmission time to complete the delivery may not be satisfactory. Further, in addition to problems involved with networks of similar technology, diagnosing the source of network transmission problems in a network containing a wide variety of technologies is difficult without a good testing and error detection process. For instance, systematic manual testing of network components is very time consuming and limited.

Thus, a heretofore unaddressed need exists in the industry to address the aforementioned and other deficiencies and inadequacies.

SUMMARY

One preferred embodiment of the present invention provides a system and method for examining the performance of sub-systems in an inter-messaging network of voice mail systems. This preferred embodiment includes a network query device that connects to the inter-messaging network and requests a test data file to be retrieved from a particular voice mail sub-system in the inter-messaging network. The requests for the test data file are generated according to user command. Accordingly, the performance of sub-system(s) in the inter-messaging network, as represented by the result of the request attempt, is preferably assessed according to a defined level of performance, such as a preferred time limit.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 7 is a representation of a portion of the output generated by one embodiment of the network query device of FIG. 4.

FIG. 8 is a representation of a portion of the output generated by one embodiment of the network query device of FIG. 4.

FIG. 9 is a representation of a portion of the output generated by one embodiment of the network query device of FIG. 4.

FIG. 10 is a representation of a portion of the output generated by one embodiment of the network query device of FIG. 4.

DETAILED DESCRIPTION

Figure 1:
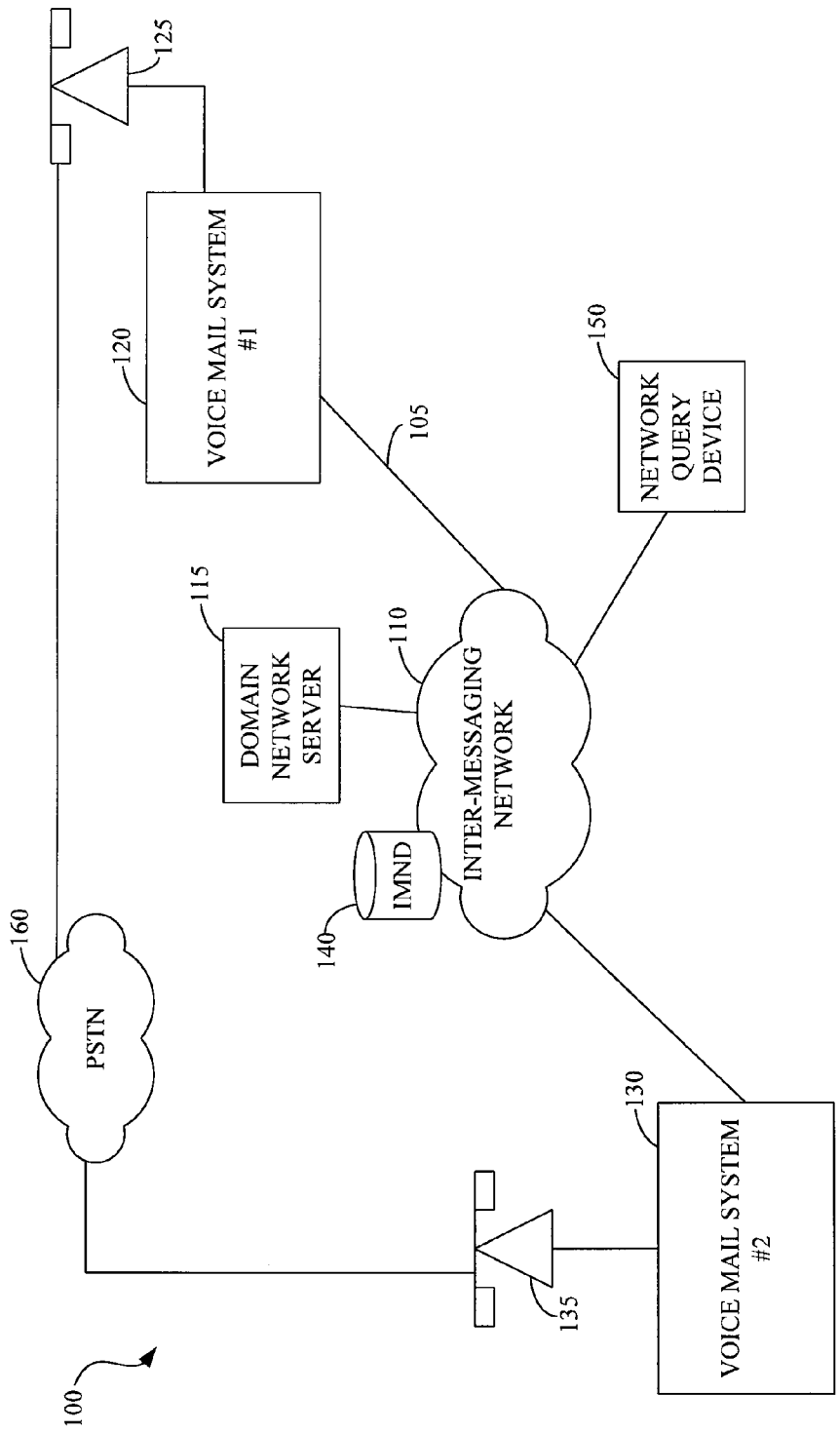
FIG. 1 is a block diagram of an embodiment of a communication examination system 100 of the present invention.

FIG. 1 is a block diagram of an embodiment of a communication examination system 100 of the present invention. The communication examination system 100 includes an inter-messaging network 110. The inter-messaging network 110 is a communication network that enables communication between similar and different voice mail systems or platforms 120, 130. Accordingly, the inter-messaging network 110 ties various voice mail platforms so that they can send messages to each other over a Transport Control Protocol/Internet Protocol (TCP/IP) network. The inter-messaging network 110 and voice mail systems 120, 130, for example, may follow an Audio Messaging Interchange Specification (AMIS) standard or Voice Profile for Internet Messaging (VPIM) standard to facilitate communications between various voice mail systems 120, 130.

Via the inter-messaging network 110, numerous voice mail systems 120, 130 may communicate to one another and forward and receive voice mail messages from one another. Voice mail systems 120, 130 may be from the same vendor and utilize the same technology or may be from different vendors and may utilize different technologies but follow the same messaging protocol(s), such as VPIM and/or AMIS.

An inter-messaging network database IMND 140 maintains information about message mailboxes of users that are hosted by the respective voice mail systems 120, 130. Further, telephone devices 125, 130 are respectively connected to voice mail systems 120, 130. Note, the respective connections from telephone device 135 to voice mail system 130 and telephone device 125 to voice mail system 120 are preferably through PSTN 160 (not shown). IMND 140 typically contains, among other information, the telephone number of a user's voice mailbox and the identification of the voice mail system 120, 130 that the user's voice mailbox is on. A domain network server (DNS) 115 may be used to aid in the lookup of the Internet protocol (IP) address for the voice mail system 120, 130 based upon the identification information (e.g., a fully qualified domain name (FQDN)) for the voice mail system contained in IMND 140.

The voice mail systems 120, 130 feature the capability to store messages in a variety of audible, data formats required for providing a voice messaging service. These may include such information as spoken name, personal greeting and class of service. A lightweight directory access protocol (LDAP) server, or other online directory service, may be used to aid in the lookup of such information that is associated with a telephone number of a voice mail user. In this particular embodiment, the functionality of an LDAP server is performed by the IMND 140. Under the LDAP standard, an LDAP directory server contains data elements that form a directory tree for the inter-messaging network 110. An LDAP client (such as in a voice mail system 120, 130) connects to the LDAP directory server to obtain a set of information or to request the server to perform an operation. The directory server performs the operation or provides the requested information, if possible.

A network query device (NQD) 150 is also connected to the inter-messaging network 110 and communicates with voice mail systems 120, 130. The NQD 150 checks the operability of the inter-messaging network 110 as a whole by verifying that network interface sub-systems of the voice mail systems 120, 130 and inter-messaging network 110 transfer voice mail messages successfully at a desired level of performance. The NQD 150 may be included within a voice mail system 120, 130 or may be separate therefrom and preferably functions as an LDAP client. Also, more than one NQD 150 may be connected to the inter-messaging network 110.

Figure 2:
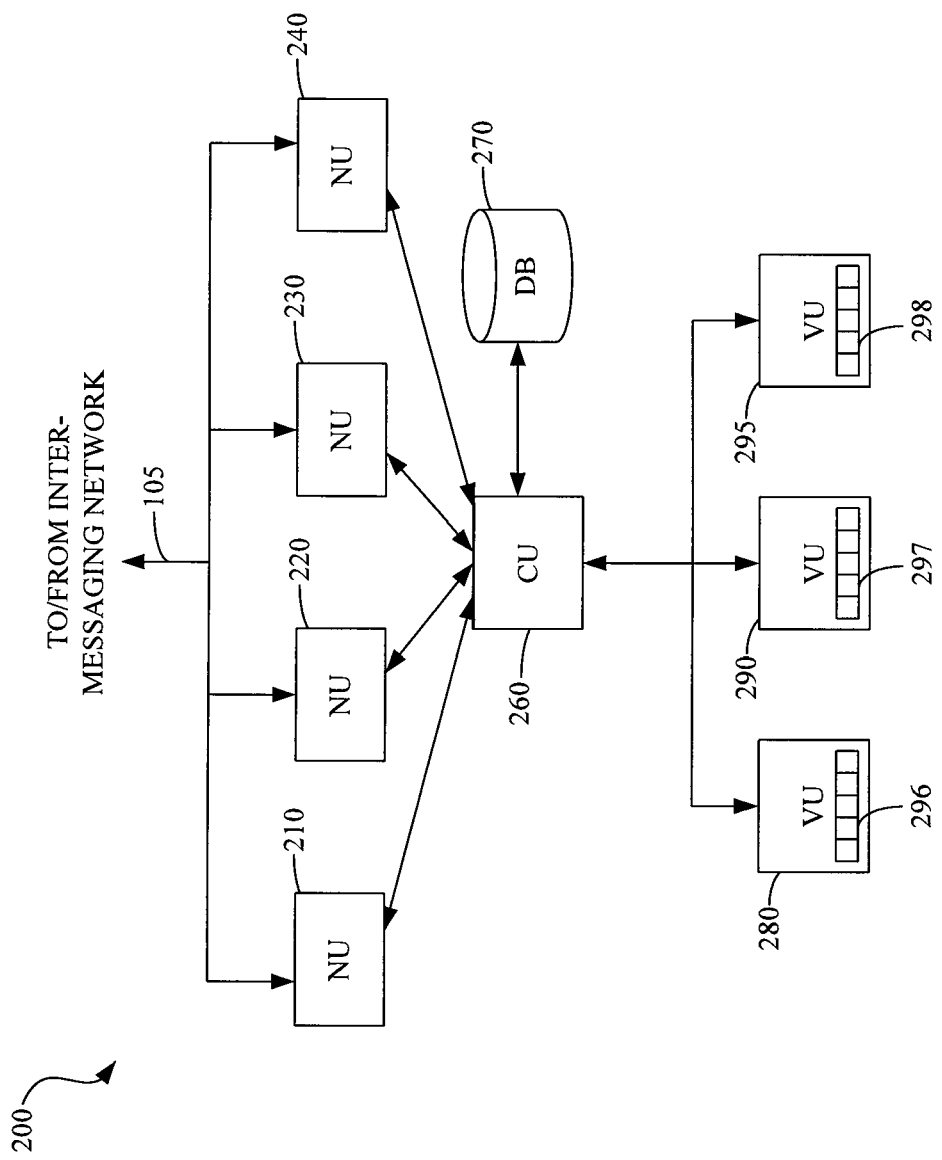
FIG. 2 is a block diagram of an embodiment of one type of voice mail system of FIG. 1.

FIG. 2 shows an embodiment of one type of voice mail system 120 that is representative of a system supplied by many vendors. This particular embodiment 200 of the voice mail system 120 includes network interface units (NU) 210-240. Each NU is active, commonly grouped in pairs, and communicates with the inter-messaging network 110. Correspondingly, each NU 210-240 communicates with a control unit (CU) 260. The CU 260 of the VMS 120 is a computer type device programmed to manage the operations of the system 120. The CU 260 communicates with a database unit (DB) 270. The DB 270 maintains information corresponding to identifying on which voice processing unit (VU) 280-295 a user's mailbox 296-298 is located.

The respective VU handles playback, generation, and storage of the voice messages for the voice mail mailboxes that it services. Each of the VUs 280-295 is also a computer type device. The VUs 280-295 each include or connect to one or more digital mass storage type memory units (not shown) in which the voice messages are stored. The CU 260 also communicates with VUs 280-295.

The NU 210-240 is a computer type device that acts as an interface between the voice mail system 120, that typically operates on a Unix operating system, and the TCP/IP inter-messaging network 110. There are typically multiple NUs 210-240 per voice mail system 120. The number may vary depending on the number of users of a respective platform, for example. Communication 105 from the inter-messaging network 110 to the VMS 200 is distributed between the plurality of NUs 210-240. Each NU 210-240 communicates with the CU 260. Accordingly, the CU 260 manages requests from the various NUs to communicate with the various VUs.

For example, consider a request from a voice mail system #2 130 to retrieve a voice recording from a user's mailbox contained on voice mail system #1 120, 200 as represented in FIG. 2. The VMS #2 130 sends the request for the spoken name over the inter-messaging network 110 to the VMS #1 120, 200. The VMS #1 120, 200 receives the request and forwards it to one of the NUs 210-240 contained within the system 120, 200. One of the NUs 210-240 receives and processes the request. The processing includes querying the CU 260 for information about the mailbox (e.g., whether the mailbox exist on this platform, whether it has a recorded spoken name announcement, if so, which VU stores the spoken name announcement, the path/filename where it is stored, etc.). The CU 260 knows some of this information directly, but other items must be retrieved from the DB 270. After the NU gets a response from the CU 260, the NU gets the recorded spoken name announcement directly from the VU and returns it to the remote system that requested it. The communications between NU, CU, and DB are in platform proprietary formats, where LDAP is used between the NU, IMND, and the far end NU.

Figure 3:
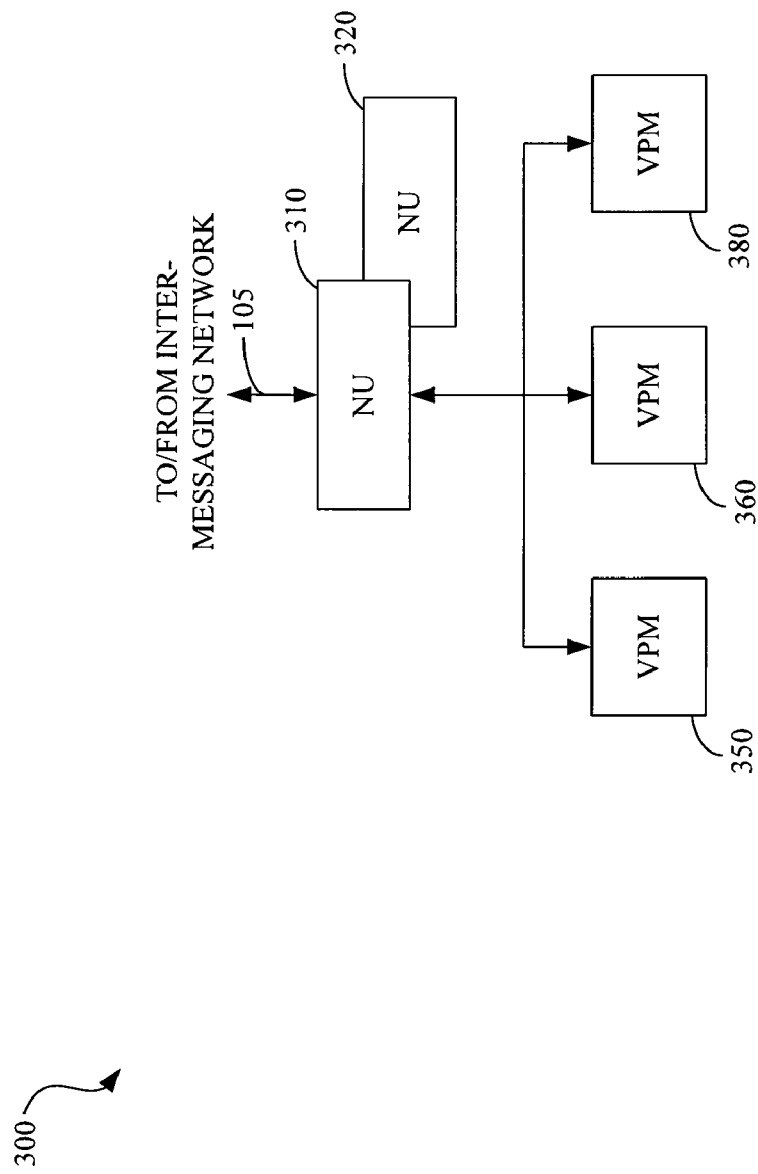
FIG. 3 is a block diagram of an embodiment of one type of voice mail system of FIG. 1.

FIG. 3 shows another representation of a voice mail system 130, 300 that varies from the VMS 120, 200 and may be utilized in the inter-messaging system 110, along with other voice mail systems. Here, the functionality of the CU devices and DB device is combined into a (computer-type) voice processing machine (VPM) 350-380. NU devices 310-320 act as servers for VPMs 350-380 and network 110. NU's 310-320 contain database pertaining to each associated VPM. One NU device is active and the additional NU is provided as a backup for the active NU in case it fails. Network routing information for the VMS 130, 300 is directed to a virtual address for the associated NU pair. Use of the virtual address allows only the active unit to respond to network communication.

Within VMS 300, the active NU communicates with various voice processing machines VPMs 350-380. Accordingly, each VPM 350-380 also contains a database maintaining information corresponding to identifying a user's mailbox 296-298. Communication from the inter-messaging network 110 is directed to a VPM 350-380 via the NU.

For example, consider a request from a voice mail system #1 120 to retrieve a voice recording from a user's mailbox contained on voice mail system #2 130, 300, as represented in FIG. 3. The VMS #1 120 sends the request over the inter-messaging network 110 to the active NU. The active NU receives the request and forwards it to the appropriate VPM 350-380 contained within the system 130, 300. The receiving VPM then retrieves the voice recording for the appropriate user's mailbox. Note, other VMS systems may feature different technological designs than shown in FIGS. 2-3 and are contemplated by the present invention.

Figure 4:
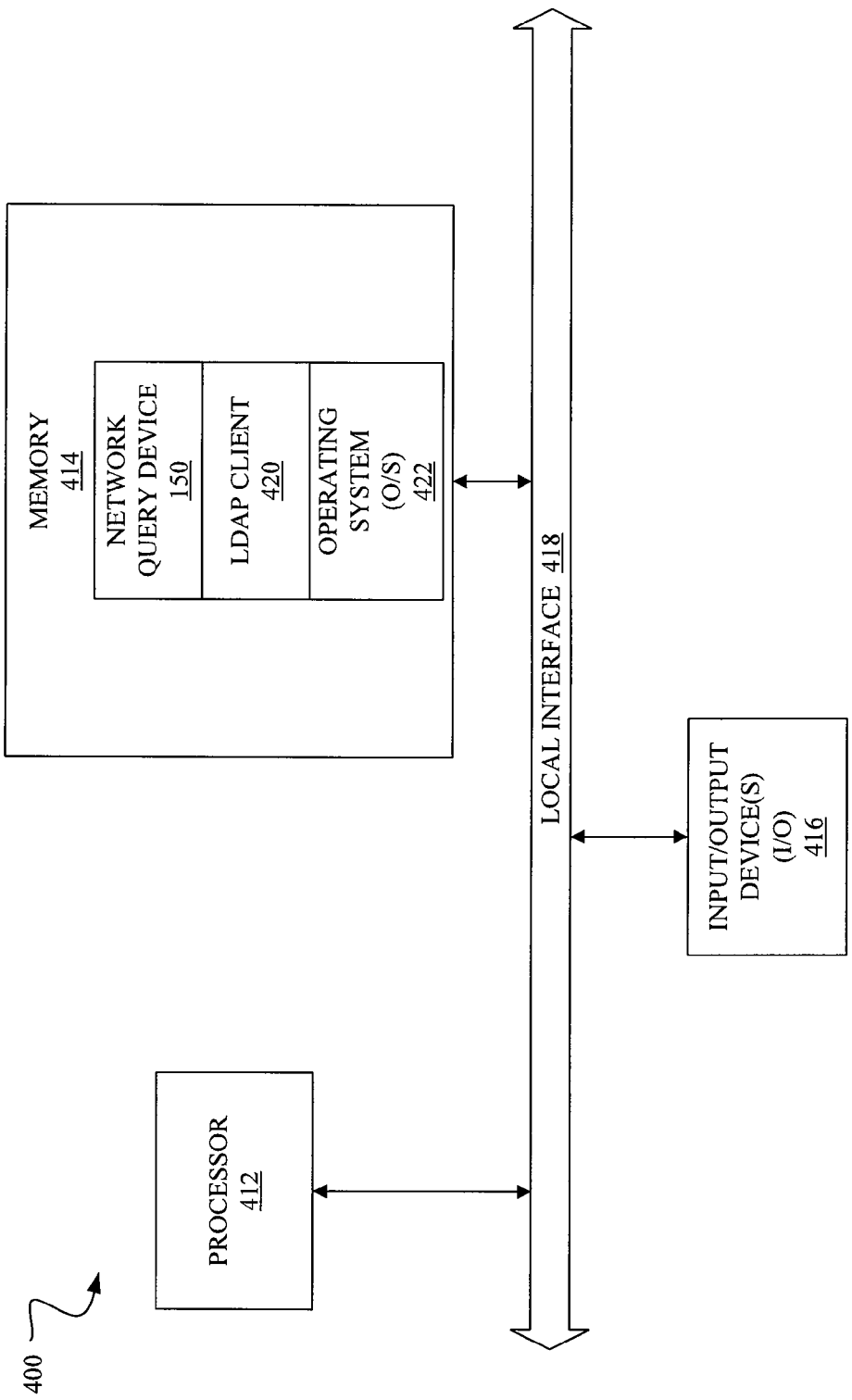
FIG. 4 is a block diagram of an embodiment of a network query device of FIG. 1.

FIG. 4 shows an embodiment 400 of the NQD 150 as employed in the communication examination system 100. As stated previously, the NQD 150 does not have to share (but may) computing resources with network interface sub-systems, such as a NU 210-240, 310-320. The NQD 150 may be a stand-alone computing device that is capable of communicating on the inter-messaging network 110, via the LDAP protocol for example.

The NQD 150 of the invention can be implemented in software (e.g., firmware), hardware, or a combination thereof. In the currently contemplated best mode, the NQD 150 is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the NQD of the present invention is shown in FIG. 4. In FIG. 4, the NQD is denoted by reference numeral 150.

Generally, in terms of hardware architecture, as shown in FIG. 4, the computer 400 includes a processor 412, memory 414, and one or more input and/or output (I/O) devices 416 (or peripherals) that are communicatively coupled via a local interface 418. The local interface 418 can be, for example but not limited to, one or more buses or other wired or wireless connections, as is known in the art. The local interface 418 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 412 is a hardware device for executing software, particularly that stored in memory 414. The processor 412 can be any custom made or commercially available processor, a central processing unit (CPU), an auxiliary processor among several processors associated with the computer 400, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 414 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 414 may incorporate electronic, magnetic, optical, and/or other types of storage media. Note that the memory 414 can have a distributed architecture, where various components are situated remote from one another, but can be accessed by the processor 412.

The software in memory 414 may include one or more separate programs, each of which comprises an ordered listing of executable instructions for implementing logical functions. In the example of FIG. 4, the software in the memory 414 includes the NQD 150 in accordance with the present invention, a LDAP client 420, and a suitable operating system (O/S) 422. A nonexhaustive list of examples of suitable commercially available operating systems 422 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 422 essentially controls the execution of other computer programs, such as the NQD 150, and provides scheduling, input-output control, file and data management, memory management, and communication control and related services.

The NQD 150 may be a source program, executable program (object code), script, or any other entity comprising a set of instructions to be performed. When a source program, then the program needs to be translated via a compiler, assembler, interpreter, or the like, which may or may not be included within the memory 414, so as to operate properly in connection with the O/S 422. Furthermore, the NQD 150 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In the currently contemplated best mode of practicing the invention, the NQD 150 is written as computer code using the Perl programming language.

The Y/O devices 416 may include input devices, for example but not limited to, a keyboard, mouse, scanner, microphone, etc. Furthermore, the I/O devices 416 may also include output devices, for example but not limited to, a printer, display, etc. Finally, the I/O devices 416 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 400 is a PC, workstation, or the like, the software in the memory 414 may further include a basic input output system (BIOS) (omitted for simplicity). The BIOS is a set of essential software routines that initialize and test hardware at startup, start the O/S 422, and support the transfer of data among the hardware devices. The BIOS is stored in ROM so that the BIOS can be executed when the computer 400 is activated.

When the computer 400 is in operation, the processor 412 is configured to execute software stored within the memory 414, to communicate data to and from the memory 414, and to generally control operations of the computer 400 pursuant to the software. The NQD 150 and the O/S 422, in whole or in part, but typically the latter, are read by the processor 412, perhaps buffered within the processor 412, and then executed.

Figure 5:
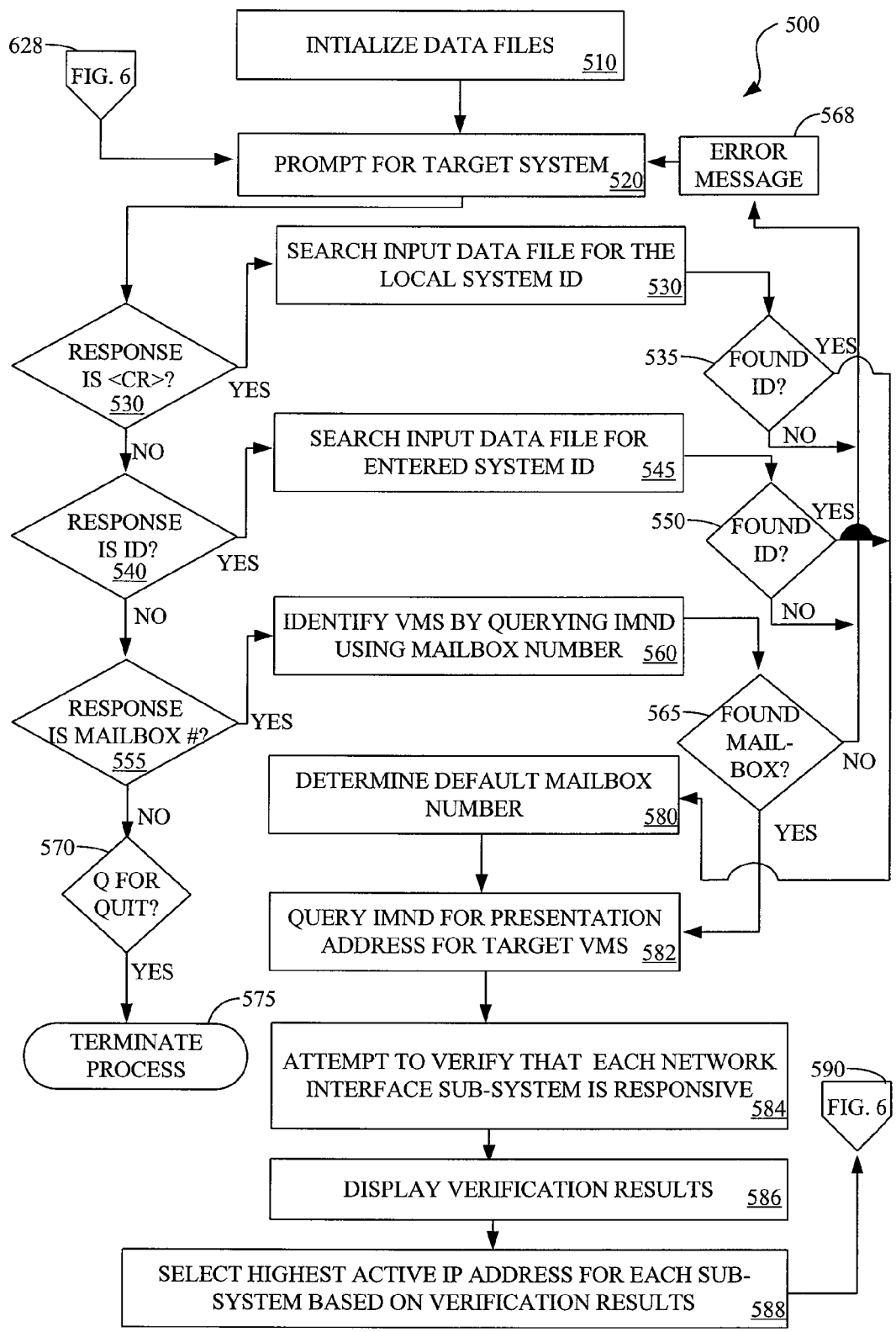
FIG. 5 is a flowchart illustrating the functionality 500 of one embodiment of the network query device of FIG. 4.
Figure 6:
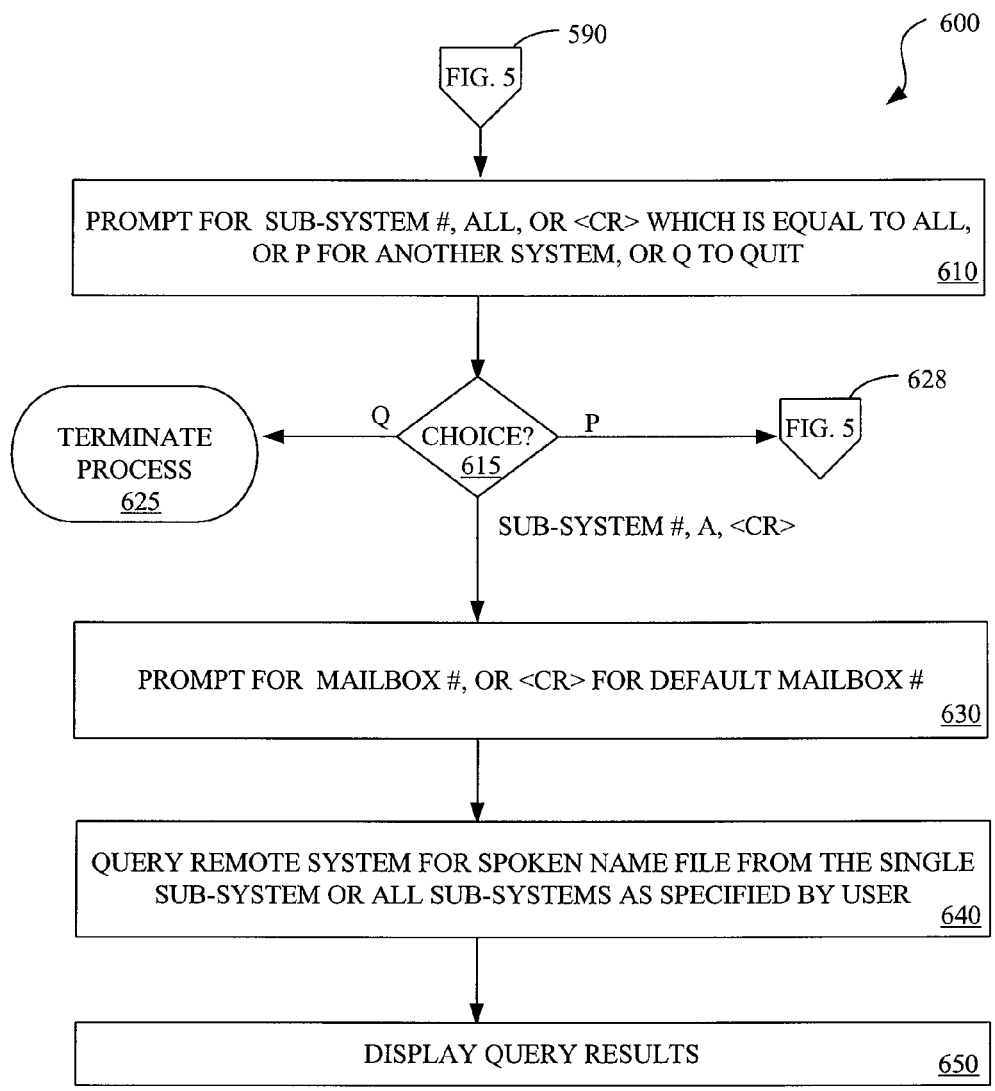
FIG. 6 is a flowchart continuing the functionality 500 initiated in FIG. 5.

When the NQD 150 is implemented in software, as is shown in FIGS. 5-6 hereafter, it should be noted that the NQD 150 can be stored on any computer readable medium for use by or in connection with any computer related system or method. For example, the NQD 150 may be detailed in a computer program or script that runs on a voice mail system or a stand alone server. In operation of the script, the NQD 150 simulates a request to a remote voice messaging system for particular subsystem(s) and for a specific mailbox number.

In the context of this document, a computer readable medium is an electronic, magnetic, optical, or other physical device or means that can contain or store a computer program for use by or in connection with a computer related system or method. The NQD 150 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the NQD 150 is implemented in hardware, the NQD 150 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Referring again to FIG. 1, the general operation of the inter-messaging system 110 will now be described. Consider the following common scenario: a first user logs into his voice mail system and decides to send a voice mail message to a second user of a different voice mail system. The first user enters the mailbox number of the second user, and then hears a recording (generated during setup of the second user's voice mail system) by the second user of the second user's voice saying the second user's name over the telephone PSTN network 160 or a wireless network (not shown). This announcement of a user's name is typically referred to as a "spoken name" and is stored and played back from the user's voice mail system 130.

The prompts the first user hears to generate a voice message or play back a voice message from another user are provided by the first user's local voice mail system 120. The only audio response provided by a remote voice mail system of another user is the user's spoken name. Typically, a local voice mail system 120 has a limited time frame in which it will wait to receive the spoken name from a remote voice mail system 130. If the spoken name is not received within that time frame (e.g., 3 to 5 seconds), the local voice mail system will typically announce the digits of the other party's phone number in lieu of the spoken name.

The first user may then leave a voice message by generating a voice recording on his or her local voice mail system 120. The local voice mail system 120 sends the recording via TCP/IP over the inter-messaging network 110 to the remote VMS 130. Then, the local voice mail system 120 announces a confirmation that the message was sent.

When the second user listens to the voice message, the voice mail system 130 of the second user may check or query the inter-messaging network database (IMND) 140 to see if the originator (first user) of the voice message is contained in the IMND 140. If the originator of the voice message is contained in the IMND 140, then at the end of the playback of the voice message, the second user's local voice mail system 130 provides the second user the option of generating a reply to the originator (first user). The reply, if made, will be sent to the Internet address of the remote voice mail system 120 registered with the originator (first user) in the IMND 140.

Alternatively, consider the scenario where the second user may check to see if there are any messages for the second user in the second user's mailbox (stored on a VU) on the local VMS. Therefore, the second user can log into his or her mailbox on a VU within his or her local VMS 130 and listens to any messages that have been left for the party. During the time that the second user is listening to the message, the second user's local VMS 130 checks to see if it can reply to the message by sending queries to the IMND 140 in the inter-messaging network 110. The queries check to see if the telephone number (of the first user) that sent the message being played is in the IMND 140. If so, the IMND 140 returns the Internet address of the remote VMS 120 that the sender (first user) resides on.

The local VMS 130, upon receiving the Internet address of the sender's voice mail system 120, requests the spoken name for the sender from the remote voice mail system 120 and receives it, preferably, within the stated time limit for that local system 120 which may be 3 to 5 seconds, for example. After the message has finished playing, the VMS 130 for the second user will then play the spoken name and prompts the second user to generate a reply by pressing a particular key on the second user's telephone 135, for example. From these scenarios, it is shown that at retrieval of a spoken name is an integral component of modern voice mail communication.

To assess the performance of the inter-messaging network 110, the NQD 150 of the communication examination system 100 keys on the fact that the retrieval of the spoken name from another voice mail system 130 is an important indicator of how the inter-messaging network 110 is performing in its entirety. For instance, if a VMS 120 can request a spoken name for a particular user of a different VMS 130 and receive that spoken name in 3 to 5 seconds, then the inter-messaging network 110 can generally be assumed to be working satisfactorily. However, if a spoken name is not received within an acceptable time, then that is symptomatic of a possible technical defect in the inter-messaging network 110.

Specifically, by requesting and retrieving the spoken name, the functionality that is employed in sending a regular voice message can be tested in the inter-messaging network 110. For example, functions such as checking whether the user's mailbox or telephone number is in the IMND 140 and whether the Internet address of the calling party's VMS 130 is in the IMND 140 are analyzed. Further, the functionality of system components and connections are tested in and between two voice mail systems 120, 130 in communication, including routing and switching capabilities of the inter-messaging network 110. Accordingly, the retrieval of the spoken name is a valuable indicator of how the inter-messaging network 110 is working.

FIGS. 5-6 depict the functionality 500, 600 of a preferred implementation of the NQD 150. It should be noted that, in some alternative implementations, the functions noted in the various blocks may occur out of the order depicted in this figure and subsequent figures. For example, two blocks in succession in a figure may, in fact, be executed substantially concurrently or the blocks may be executed in reverse order depending upon the functionality involved.

Referring now to the flowchart of FIG. 5, the present invention includes a process 500 for evaluating the operation of the inter-messaging network 110. The process 500 involves initializing data files that contain or are to contain input and output data, as shown in block 510. For example, an input data file may be stored in a database that is accessible by the NQD 150 and may contain information about VMS subsystems and components that is retrieved by the NQD 150 to carry out certain operations. Next, the user is prompted to specify the particular VMS 120, 130 in the inter-messaging network 110 that is to be evaluated, as shown in block 520. Note, the user may provide input commands or responses via computer-type interfaces such as a keyboard or mouse.

If the user responds with a carriage return ("<CR>"), via a keyboard for example, then the input data file is searched for the system identifier of the local VMS, as shown in steps 530-535. Alternatively, if a user provides a particular VMS identifier or "System ID" name, then the system ID name is verified to be in the input data file, as shown in steps 540-545. Or, if the user provides a particular mailbox number, the mailbox number is used to query the IMND 140 to identify the voice mail system for that mailbox number, as shown in blocks 555-560. Note, to terminate the program, the operator can give the command to do so, such as the letter "Q," via a keyboard, as shown in steps 570-575. If a target system cannot be determined from the response provided by the user or operator, then an error message is displayed to the user, as shown in blocks 535, 550, and 565 in association with block 568.

If, however, the target system was determined from the user's response, then the predefined (default) target mailbox number is determined, as shown in block 580. The pre-defined test mailbox for each VMS is located in and retrieved from an input data file. Alternatively, a specific mailbox number may be provided (as described above) by the operator and used as the target mailbox, as shown in block 555.

Next, after the target mailbox has been determined, the IMND 140 is queried for the presentation address of the target VMS, as indicated in block 582. The presentation address is the Internet domain address for the target VMS. Each active network interface sub-system (e.g., NU 210-140, 310-320) of the target VMS is tested to verify that each respective sub-system is responsive to network communications. Typically, this step is performed using a Packet Internet Grouper (PING) program or command to ensure that each of the network interface sub-systems is operating and is accessible on the inter-messaging network 110, as shown in block 584. Since part of the function of the process 500 is to determine how many network interface subsystems are featured in a voice mail system, the process may involve accessing an input data file in a database (not shown) that contains this information for every voice mail system in the inter-messaging network 110.

The results of the verification procedure are then displayed, as shown in block 586. Consider, in some voice mail systems, each network interface sub-system (e.g., NU 210-240) is assigned more than one IP address so that the sub-system may perform different services or operations (e.g., send and receive operations) simultaneously on several Internet addresses. Therefore, for such a system, the NQD 150 may execute the PING command (or "ping") for each Internet address that is assigned to a respective sub-system. Although a network interface sub-system may have more than one Internet address, if each Internet address responded successfully to the PING command, the query for the spoken name is sent to only one of the Internet addresses for the sub-system. For example, the NQD 150 may arbitrarily select the Internet (IP) address that has the largest numerical order and also responded successfully to the PING command, as shown in step 588.

The continuation of the process 500 is shown in FIG. 6. In steps 590-610, the user is prompted to specify the network interface sub-system(s) that the user wants to target for evaluation. If the user specifies a particular sub-system number, as indicated in blocks 610-615, then that particular sub-system is only tested. The network interface sub-system number is the number in rank as the sub-systems are displayed to the user for the verification results in block 585, or some other number that uniquely identifies a specific sub-system.

Alternatively, if the user specifies "A" or a carriage return, via a keyboard, then the network interface sub-systems for the target VMS may be evaluated, as shown in blocks 610-615. Otherwise, if the user specifies "P," then the user can specify another target VMS to check, as mentioned in steps 628 and 520. On the other hand, if the user specifies "Q" then the process terminates, as shown in block 625.

Next, in block 630, the user is prompted to specify the mailbox number that is to be tested. In particular, a test data file, such as a spoken name, will be attempted to be retrieved from this mailbox number. The user may specify a particular mailbox number, as shown in block 630. Alternatively, the user may enter a carriage return ("<CR>"), via keyboard, to test the default test mailbox number for the target VMS. After the target test mailbox has been determined, a spoken name file is requested from the specified network interface sub-system(s), as shown in block 640.

In preferred embodiments, the spoken name query is performed using a Lightweight Directory Access Protocol (LDAP) search utility ("ldapsearch") supported by the NQD 150 and the inter-messaging network 110. LDAP is a widely accepted, standard that allows client applications to access directory information over the inter-messaging network 110. LDAP is supported by most vendors of voice mail systems and is consistent with the X.500 directory model. Since many voice mail systems utilize LDAP protocol, the NQD 150 can run off of a voice mail system and check if the voice mail system is able to communicate successfully with other voice mail systems.

LDAP directory services can be provided within voice message systems that are LDAP capable, for example, or on a standalone LDAP server. Under the LDAP directory structure, clients can access directory information, such as the spoken name, via a telephone number. Note, LDAP voice messages are made up of one or more parts, at least one of which must be voice message and may be MIME encoded. The VPIM profile allows for optional, additional MIME parts for spoken name, forwarded messages and fax messages, and an electronic business card data definition, that allows automatic updating of directory information with phone number, text name or email address.

For example with LDAP, voice mail systems can read or update the IMND 140 which also recognizes the LDAP protocol. For instance, after creating a voice mail message by phone or forwarding a message to another recipient, the user can address the message by entering the recipient's phone number. Then, the local VMS 120 may make a LDAP query over the inter-messaging network 110 to the IMND 140 requesting for the identity (e.g., FQDN) of the voice mail system hosting the mailbox of the recipient. Then, the local VMS requests and receives an IP address listed in the DNS 115 for a network interface sub-system of that voice mail system identity. Accordingly, the local VMS sends a LDAP query to this network interface sub-system asking for specific attribute information, such as a spoken name, associated with the mailbox number of the recipient. The remote VMS 130 might then return the requested spoken name attribute from the remote VMS 130 to the local VMS 120. When the user on the local VMS 120 hears and confirms the spoken name, it validates that the mailbox address of the recipient is correct. The local VMS 120 may then send the message.

Therefore, by using an LDAP search utility, the NQD 150 can query the IMND 140 to obtain the identify of the VMS 120, 130 which hosts the recipient's voice mailbox. To do so, the NQD 150 provides the necessary information to complete the search such as a mailbox number, or telephone number, and the test data items that are being requested, such as a spoken name or, in alternative embodiments, a specific voice message. Then, the NQD 150 utilizes a LDAP client to initiate and complete the request under LDAP protocol. If the task is completed and the test data item or file is successfully retrieved. Then this can be indicated by the tags embedded in the LDAP message identifying the data file that is returned to the NQD 150.

The results of the spoken name query are then displayed, as shown in step 650. For example, textual representations of the spoken name data file may be displayed to verify its successful retrieval. Results typically also include the amount of time that elapsed ("delay time") between the initiation of the request for the spoken name and its successful retrieval. FIGS. 7-10 display portions of one embodiment of screen shots of output generated by a user's inputs for one implementation of the network query device 150.

As shown in FIG. 7, the NQD 150 for this embodiment is activated by running a Perl program script from a computer system prompt, as shown by pointer 710. In this particular embodiment, the NQD 150 is hosted on a local VMS 120, 130. Accordingly, the NQD 150 identifies the local VMS "VMS95", as shown by pointer 715. The user or operator is then prompted to enter a remote or local voice mail system, as shown by pointer 720 and in accordance with block 520. For this example, the user selected a remote platform with a System ID of "VMS97," as noted by pointer 725. The NQD 150 then provides the presentation domain or address for the target VMS and pings the network interface subsystems, such as NUs, located on the target VMS, as shown by pointer 730. As previously stated, information about the number and identifiers of the NUs may be retrieved from an input data file that is accessed by the NQD 150.

The user is then prompted to specify which network interface sub-systems are to be evaluated, as shown by pointer 735 and in accordance with block 610. In this example, the user selects to evaluate the first NU listed for the PING results, as indicated by pointer 735. It is the particular NU who possesses an IP address ending with "64", as shown by pointer 730. Next, the user is prompted to select a particular mailbox to evaluate, as shown by pointer 740. Here, the user selects the default test mailbox ("5558769555") by entering a carriage return, as shown by pointer 740 and in accordance with block 630. The NQD 150 then queries the IMND 140 for the presentation address or domain of the test mailbox selected, as shown by pointer 745 and in accordance with block 582. As a result, the spoken name query is performed for the test mailbox and the results are displayed, as shown by pointer 750 and in accordance with block 640. Here, the delay in retrieving the spoken name from the target mailbox is 2 seconds. Also, part of the data retrieved by the spoken name query is displayed, as indicated by pointer 755.

A continuation of the interaction between the user and NQD 150 as started in FIG. 7 is displayed in FIG. 8. In FIG. 8, after the result(s) of the previous spoken name requests, the user is prompted to select another NU to evaluate, among other choices, as shown by pointer 810. Here, in this example, the user selects to perform spoken name queries for each of the active NUs in the target VMS. Accordingly, as highlighted by pointers 820-840, the NQD 150 retrieves and displays requested spoken name information and the retrieval ("delay") time for the 5 active NUs for the target VMS.

Correspondingly, FIG. 9 is a continuation of the interactive session of FIGS. 7 and 8. As indicated by pointer 910, the user selects to enter a new voice mail system to target. The user enters "VMS77" as the new target VMS, as indicated by pointer 915. The user also specifies that the second NU listed should be tested, as shown by pointer 920, and also specifies a mailbox ("5554043755") to evaluate as indicated by pointer 925.

FIG. 10 is a continuation of the interactive session of FIGS. 7-9. Note, prior examples of FIGS. 7-9 may be assumed to have evaluated voice mail systems 200 of the type of FIG. 2. Diversely, FIG. 10 demonstrates the NQD 150 being employed by a user to evaluate a voice mail system of FIG. 3. As indicated by pointer 1010, the user enters a system ID ("30116") for a VMS of FIG. 3. As previously explained, a VMS system 300 of FIG. 3 has one active network interface sub-system (e.g., NU 310), where another sub-system 320 is available as a back up to the active network interface sub-system 310 in case the active sub-system 310 fails. As indicated by pointer 1020, the active Internet addresses (IPs) on the remote system 120, 130 belong to a virtual Internet address ("128") that points to the active network interface subsystem. Here, the active subsystem has an Internet address ending in "129" and the back-up sub-system has an Internet address ending in "130." When the user selects to evaluate the listed sub-systems, as shown by pointer 1030, there is only one active network interface sub-system and thus only the sub-system ending in "129," for this example, is evaluated, as shown by pointer 1040.

The functionality 500, 600 of the NQD 150 allows a technician to assess comprehensively and automatically a particular subsystem of a voice mail system 120, 130 by examining the voice mail sub-system and displaying the results of the test. Specifically, for one preferred embodiment of the invention, a primary purpose of the communication examination system 100 is to verify LDAP spoken name query functionality on voice mail sub-systems via the NQD embodied in a Perl program script. The script first pings each IP addresses (or virtual IP address) of each network interface sub-system of a targeted VMS 120, 130 to determine which ports of the sub-system(s) are active. The script then launches LDAP spoken name queries to the sub-systems or the particular sub-system selected in the target VMS. The default operation is to target the local VMS platform 120, 130 for the query, but any VMS platform may be selected by entering a mailbox number on the platform, or the System ID. If a VMS system of the type shown in FIG. 2 is selected, the user can query all NUs 210-240 or any one NU. Alternatively, if a VMS system of the type shown in FIG. 3 is used, then a virtual address may always be used to query the active NU 310.

When the spoken name query is to the local voice mail platform 120, 130, the results of the spoken name query should be independent of any inter-messaging network problems or issues except for possible impairments caused by a switch or router at the local site. Correspondingly, when querying a remote voice mail platform 120, 130, the performance results may include impairments due to the inter-messaging network 110 between the local and remote voice mail sites 120, 130. Accordingly, a technician can target a specific voice message sub-system that is suspected to have technical problems.

Further, to aid a technician in diagnosing or troubleshooting the causes of network problems revealed in the output results, the NQD 150 may generate a help guide to list possible courses of action for the error messages generated. With a help guide, a technician may be provided tips that the technician can consider in order to remedy or debug any network problems revealed by the NQD 150.

Otherwise, testing of communication capabilities between different voice mail systems or sub-systems generally requires technicians to manually test the systems which is very time consuming and labor intensive. Further, manual testing is not necessarily a good indicator of how well a network is performing in its entirety. For example, the voice mail system 200 of FIG. 2 features redundant NUs 210-240 that may receive the spoken name request. Although there may be several NUs that are not functioning properly, the spoken name request may be directed to one of the properly working NUs that is able to fulfill the spoken name request. Accordingly, to a technician performing a manual test, that voice mail system would appear to be working properly although there are several components of the system that have in fact failed.

By way of illustration, if an operator tries to manually test a voice mail system 120, 130 on an inter-messaging network 110 by calling a message mailbox and witnessing that a spoken name announcement is not heard over the telephone line in 3 to 5 seconds, the operator will not know if the spoken name was only slightly delayed or never received at all. However, with the communication examination system 100 and method 500, 600 a technician is better able to diagnose the problem with a voice mail system 120, since more information is obtained about how the system is performing.

Figure 11:
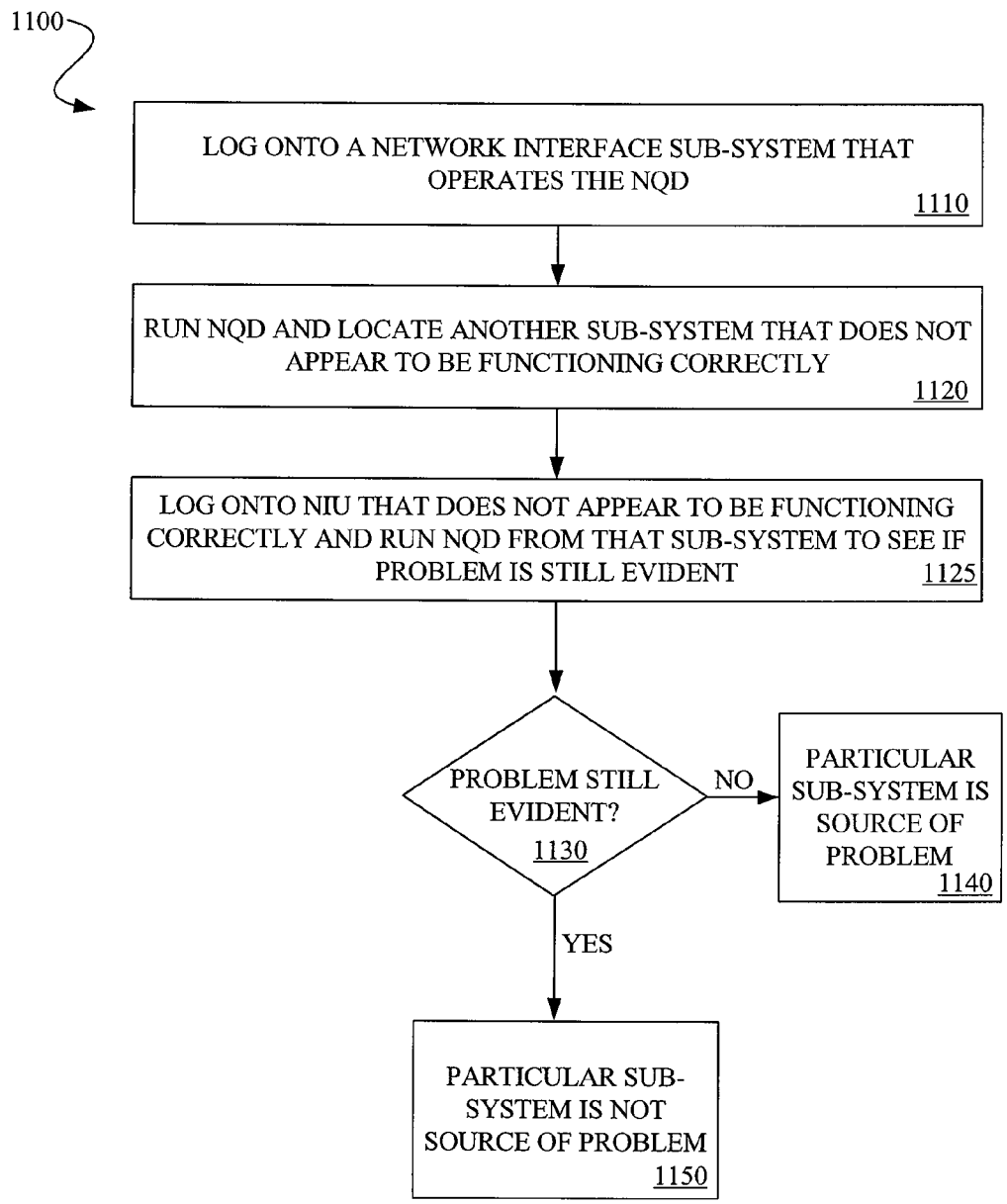
FIG. 11 is a flowchart describing an embodiment of a process for operating the network query device to locate a source of a technical problem in an inter-messaging network.

It should be emphasized that the above-described embodiments of the present invention, particularly, any "preferred" embodiments, are merely possible examples of implementations, merely set forth for a clear understanding of the principles of the invention. For example, it may be preferable that each network interface sub-system in the inter-messaging system may include the network query process, as shown in one embodiment of an evaluation process 1100 of FIG. 11. In this way, a technician can log onto any network interface sub-system that operates the NQD 150 to test the functionality of other sub-systems in the inter-messaging network, as shown in step 1110. Once the technician notices that a particular network interface sub-system in a particular voice mail system is producing failures, as depicted in steps 1120-1125, the technician can log on to those particular sub-systems and notice if the problem is still evident. If so, the problem may be diagnosed to involve that particular network interface sub-system, as shown in steps 1130-1140. If not, then the technician has diagnosed that the particular sub-system is in fact not malfunctioning, as shown in steps 1130 and 1150. Rather, the problem is occurring somewhere in the inter-messaging network 110 between the two voice mail systems 120, 130.

Accordingly, many variations and modifications may be made to the above-described embodiment(s) of the invention without departing substantially from the spirit and principles of the invention. For example, it is contemplated that the network query device may be employed for other messaging formats and technologies besides voice mail, such as e-mail and fax, for example. All such modifications and variations are intended to be included herein within the scope of this disclosure and the present invention and protected by the following claims.

The invention claimed is:

1. A system for evaluating the performance of an inter-messaging network, the inter-messaging network featuring a plurality of voice mail systems, each voice mail system being serviced by redundant network interface sub-systems that respond to voice mail requests, the system comprising:
   an examining device connected to the inter-messaging network, the examining device configured to receive identification of a particular voice mail system to be evaluated on the inter-messaging network and identification of a particular redundant network interface sub-system of at least one of a plurality of redundant network interface sub-systems that has been verified to be responsive to network communications on the identified voice mail system, wherein the examining device requests a test data file from a particular redundant network interface sub-system on the identified voice mail system and outputs a result of a request attempt, wherein the result is indicative of the performance of the redundant network interface sub-system being evaluated.

2. The system of claim 1, wherein the test data file is a spoken name for a mailbox on the identified voice mail system.

3. The system of claim 1, wherein the test data file is a voice message for a mailbox on the identified voice mail system.

4. The system of claim 3, further comprising:
   a first voice mail system, the first voice mail system hosting the mailbox; and
   a second voice mail system, the second voice mail system hosting the examining device.

5. The system of claim 1, further comprising:
a directory server that forwards the request to the network interface sub-system.

6. The system of claim 3, further comprising:
a first voice mail system hosting the mailbox, wherein the examining device does not reside in the first voice mail system.

7. A method for examining the performance of a network interface sub-system of an inter-messaging network, comprising:
receiving identification of a particular voice mail system to be evaluated on the inter-messaging network;
receiving identification of a particular redundant network interface sub-system of at least one of a plurality of redundant network interface sub-systems that has been verified to be responsive to network communications on the identified voice mail system,
requesting a test data file from a particular redundant network interface sub-system on the identified voice mail system; and
outputting a result of a request attempt, wherein the result is indicative of the performance of the redundant network interface sub-system being evaluated.

8. The method of claim 7, further comprising:
prompting the user to identify a particular voice mail system to be evaluated on the inter-messaging network; and
providing the user the option of identifying a default network interface sub-system for the particular voice mail system to perform the request.

9. The method of claim 7, further comprising:
displaying a guide to help troubleshoot a particular result if the particular result does not satisfy a defined performance standard, wherein the defined performance standard is a time limit for retrieving the test data file.

10. The method of claim 7, further comprising:
identifying a particular voice mail system comprising a plurality of network interface sub-systems;
verifying if each of the network interface sub-systems is responsive to network communication;
displaying whether each of the network interface sub-systems is responsive; and
prompting the user to select a particular network interface sub-system from the network interface sub-systems that were verified to be responsive to network communications.

11. The method of claim 7, wherein the test data file is a spoken name.

12. The method of claim 7, wherein the test data file is a voice message.

13. The method of claim 7, further comprising:
prompting the user to identify a particular voice mail system to examine; and
prompting the user to identify a particular mailbox in the particular voice mail system to retrieve the test data file from.

14. A computer readable storage medium embedded with a computer program with executable instructions for examining the performance of a network interface sub-system of an inter-messaging network, the program for performing:
receiving identification of a particular voice mail system to be evaluated on the inter-messaging network;
receiving identification of a particular redundant network interface sub-system of at least one of a plurality of redundant network interface sub-systems that has been verified to be responsive to network communications on the identified voice mail system,
requesting a test data file from a particular redundant network interface sub-system on the identified voice mail system; and
outputting a result of a request attempt, wherein the result is indicative of the performance of the redundant network interface sub-system being evaluated.

15. The medium of claim 14, the program further performing:
prompting the user to identify a particular voice mail system to be evaluated on the inter-messaging network; and
providing the user the option of identifying a default network interface sub-system for the particular voice mail system to perform the request.

16. The medium of claim 15, the program further performing:
displaying a guide to help troubleshoot a particular result if the particular result does not satisfy a defined performance standard, wherein the defined performance standard is a time limit for retrieving the test data file.

17. The medium of claim 14, the program further performing:
identifying a particular voice mail system, the particular voice mail system comprising a plurality of network interface sub-systems;
verifying if each network interface sub-system in the plurality of network interface sub-systems is responsive to network communication;
displaying whether each network interface sub-system is responsive to network communication; and
prompting the user to select a particular network interface sub-system of the at least one of the plurality of network interface sub-systems that was verified to be responsive to network communications.

18. The medium of claim 14, the program further performing:
verifying if each network interface sub-system of the plurality of network interface sub-systems is responsive to network communication;
displaying whether each network interface sub-system is responsive to network communication; and
prompting the user to select one network interface sub-system from the network interface sub-systems that were verified to be responsive to network communications in the verifying step.

19. The medium of claim 14, wherein the test data file is at least one of a spoken name and a voice message.

20. The medium of claim 14, the program further performing:
prompting the user to identify a particular voice mail system to examine; and
prompting the user to identify a particular mailbox in the voice mail system to retrieve the test data file from.

* * * * *